United States Patent [19]

Suzuki

[11] Patent Number: 4,884,263
[45] Date of Patent: Nov. 28, 1989

[54] PACKET-SWITCHED COMMUNICATIONS NETWORK WITH PARALLEL VIRTUAL CIRCUITS FOR RE-ROUTING MESSAGE PACKETS

[75] Inventor: Hiroshi Suzuki, Tokyo, Japan

[73] Assignee: NEC Corporation, Tokyo, Japan

[21] Appl. No.: 325,010

[22] Filed: Mar. 17, 1989

Related U.S. Application Data

[63] Continuation of Ser. No. 1,443, Jan. 8, 1987, abandoned.

[30] Foreign Application Priority Data

Jan. 9, 1986 [JP] Japan .................................. 61-2442
Apr. 15, 1986 [JP] Japan .................................. 61-85184

[51] Int. Cl.⁴ .............................................. H04J 1/16
[52] U.S. Cl. .......................................... 370/16; 370/60
[58] Field of Search ...................... 370/16, 60, 84, 85; 340/827, 825.01

[56] References Cited

U.S. PATENT DOCUMENTS

| | | | |
|---|---|---|---|
| 4,561,090 | 12/1985 | Turner | 370/54 |
| 4,625,306 | 11/1986 | Newman | 370/16 |
| 4,679,189 | 7/1987 | Olson et al. | 370/60 |
| 4,692,918 | 9/1987 | Elliott et al. | 370/16 |

Primary Examiner—Joseph A. Orsino
Assistant Examiner—Frank M. Scutch, III
Attorney, Agent, or Firm—Foley & Lardner, Schwartz, Jeffery, Schwaab, Mack, Blumenthal & Evans

[57] ABSTRACT

In a packet-switched communications network, each of a plurality of terminals sequentially transmits control packets in response to a request for call before sequentially transmitting message packets. A switching node of the network is responsive to the control packets for establishing first and second logical channels through the network. Message packets are propagated through the first logical channel. The established logical channels are monitored to detect an abnormal condition. In the event of an abnormal condition in the first logical channel the message packets are re-routed to the second logical channel.

7 Claims, 8 Drawing Sheets

FIG. 6

PATH TABLE

| SOURCE | DESTINATION | PN0 | PN1 | PN2 |
|---|---|---|---|---|
| PT11 | PT12 | PS13→PS14→PS16 | PS13→PS15→PS16 | PS13→PS15→PS17→PS16 |
| | PT10 | PS13→PS14 | PS13→PS15→PS16→PS14 | — |
| | --- | --- | --- | --- |

FIG. 7

OUTGOING ROUTE TABLE AT PS13

| INC. PHYSICAL LINE NO. (IPLN) | INC. LOGICAL CHANNEL NO. (ILCN) | OG. PHYSICAL LINE NO. (OPLN) | OG. LOGICAL CHANNEL NO. (OLCN) |
|---|---|---|---|
| 2 | 0 | 0 | 0 |
| | 1 | 1 | 1 |
| | 2 | 1 | 2 |

FIG. 8
PATH SELECTION TABLE 40

| PATH NO. (PN) | LOG. CHA. NO. (LCN) | BUSY/IDLE INDICATOR |
|---|---|---|
| 0 | 0 | 1 |
| 1 | 1 | 0 |
| 2 | 2 | 0 |
| — | — | — |

FIG. 9
SOURCE TABLE AT PS13 58

| OG. PHYSICAL LINE NO. (OPLN) | SOURCE TERMINALS (INC. LOG. CHA. NOs.) |
|---|---|
| 0 | PT11, PT18, ------ (0) |
| 1 | PT11, ------ (1, 2) |
| | |

FIG. 10
OUTGOING ROUTE TABLE
(AT PS15)

| IPLN | ILCN | OPLN | OLCN |
|---|---|---|---|
| 1 | 0 | 0 | 0 |
|   | 1 | 2 | 1 |

⇩

| 1 | 1 | 0 | 0 |
|---|---|---|---|
|   | 0 | 2 | 1 |

FIG. 11
SOURCE TABLE
(AT PS15)

| OPLN | SOURCE TERMINALS (SOURCE NODES. ILCN) |
|---|---|
| 0 | PT11 (PS13, 0) |
| 2 | PT11 (PS13, 1) |

OUTGOING ROUTE TABLE AT PS15

| IPLN | ILCN | BUSY/IDLE | OPLN | OLCN |
|---|---|---|---|---|
| 1 | 0 | 1 → 0 | 0 | 0 |
|  |  |  | 2 | 1 |

PACKET-SWITCHED COMMUNICATIONS NETWORK WITH PARALLEL VIRTUAL CIRCUITS FOR RE-ROUTING MESSAGE PACKETS

This application is a continuation of application Ser. No. 07/001,443, filed Jan. 8, 1987 now abandoned.

RELATED APPLICATION

This application is related to Co-pending U.S. patent application Ser. No. 916,429, titled "High-Speed Packet-Switched Communications System with End-to-End Flow Control and Retransmission", filed Oct. 7, 1986 by H. Suzuki and assigned to the same assignee as the present invention.

BACKGROUND OF THE INVENTION

The present invention relates to a packet-switched communications network which allows message packets to be switched over from one virtual circuit to another in a short period of time in the event of a trouble or traffic overflow.

In a virtual circuit packet-switched communications network, a route is established through the network in response to a call-setup packet sent from a source terminal before interactive communication begins and all participating switching nodes are informed of the connection to route the individual message packets that follow. The route so established is a virtual circuit, or logical channel, which is released at the end of a connection by a call-clearing packet that propagates through the network. In the event of a trouble or heavy traffic in the virtual circuit, the source terminal is informed of the trouble to interrupt the communication and send a call-setup packet again to reestablish a new virtual circuit through the network. Since the call-setup operation involves the erasing of previous routing information and registration of new routing information at all the participating switching nodes and the transmission of a return message, or proceed-to-send packet from the destination terminal to the source terminal, the communication between the source and destination terminals is interrupted for a relatively long period of time.

SUMMARY OF THE INVENTION

It is therefore an object of the present invention to provide a packet-switched communications network capable of high-speed switching of message packets from one virtual circuit, or logical channel to a trouble-free logical channel in the event of a trouble or traffic overflow.

The foregoing object is obtained by the packet-switched communications network of the invention by establishing plural virtual circuits, or logical channels, in parallel between source and destination terminals in response to a call-setup packet received from a source terminal to allow it to send message packets through one of the established logical channels and switching the packets over to another of the established channels in the event of a trouble or traffic overflow.

According to the present invention, the packet-switched communications network comprises a plurality of terminals each being capable of sequentially transmitting control packets in response to a request for a call before sequentially transmitting message packets, and a plurality of switching nodes which are associated with the terminals. Each switching node is responsive to the control packets for establishing first and second logical channels from a source terminal to a destination terminal and enabling the message packets to be propagated through the first logical channel, detecting an abnormal condition in the established logical channels and re-routing the message packets to the second logical channel when the abnormal condition is detected in the first logical channel.

According to a specific aspect of the invention, a packet switching system is provided which comprises a bus and a plurality of line controllers connected to the bus. Each line controller is responsive to control packets and message packets, the message packets having an incoming logical address and an incoming physical address. A memory is provided in each line controller for storing a first set of outgoing logical and physical addresses in a first location and a second set of outgoing logical and physical addresses in a second location, the first and second locations being respectively accessible as a function of the incoming logical and physical addresses of the message packets, wherein the first and second sets define a plurality of transmission paths between a source terminal and a destination terminal. The incoming logical and physical addresses of the message packets are updated in a line controller with the logical and physical addresses of an accessed one of the first and second sets and coupled to the bus and received by one of the line controllers determined by the outgoing physical address of the received message packets for transmission to one of the transmission paths. A central processor derives the first and second sets of outgoing logical and physical addresses respectively from the control packets received via the line controllers and writes the derived sets into the memory. A detector is provided for detecting an abnormal condition in the transmission paths. If an abnormal condition occurs in the transmission path through which the message packets are being transmitted, the route is switched over to another of the transmission paths.

BRIEF DESCRIPTION OF THE DRAWINGS

The present invention will be described in further detail with reference to the accompanying drawings, in which:

FIG. 6 is an illustration of a typical example of the path table of FIG. 3 with respect to source terminal PT11;

FIG. 7 is an illustration of a typical example of the outgoing route table of FIG. 5;

FIG. 8 is an illustration of a path selection table provided in the source terminal PT11;

FIG. 9 is an illustration of a typical example of the source table of FIG. 3 at switching node PS13;

FIG. 10 is an illustration of a typical example of the outgoing route table of a line controller at switching node PS15;

FIG. 11 is an illustration of a typical example of the source table of FIG. 3 at switching node PS15;

DETAILED DESCRIPTION
STRUCTURES AND FUNCTIONS

Figure 1:
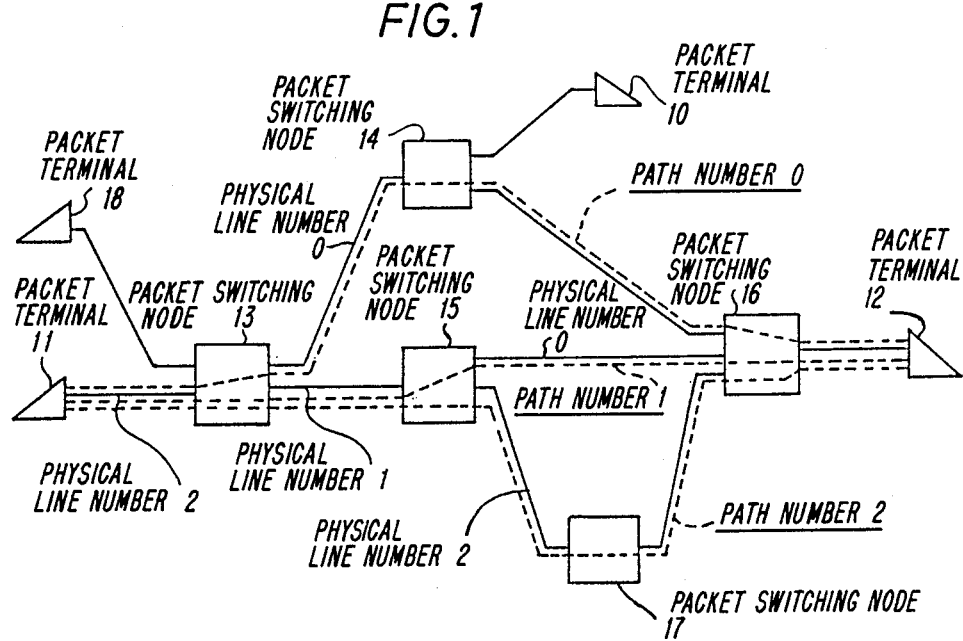
FIG. 1 is a schematic block diagram of a packet-switched communications network embodying the present invention.

A virtual-circuit packet-switched communications system schematically represented in FIG. 1 comprises packet switching offices or "nodes" PS13 to PS17 to which end users or "terminals" PT10, PT11, PT12 and PT18 are terminated. For purposes of disclosure, the switching node PS13 has three alternate routes available between terminals PT11 and PT12, one through the switching nodes PS14 and PS16, a second through the switching nodes PS15 and PS16, and a third through the switching nodes SS15, PS17 and PS16. In the virtual-circuit network of the present invention, multiple transmission paths are established between source and destination terminals in response to each call-setup control packet, and all participating nodes are informed of the established paths to enable message packets that follow to propagate through one of the established paths. Each of the transmission paths so established is a virtual circuit, or "logical channel" as is interchangeably used in data communication art. At the end of a call, all the virtual circuits are released by a call-clearing control packet propagating through the network.

Figure 2:
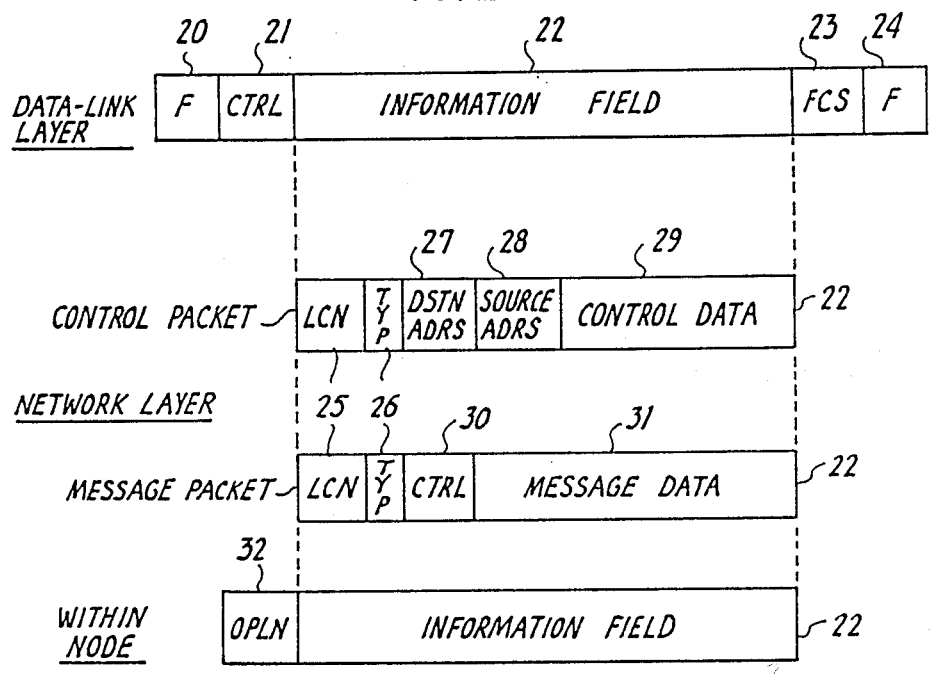
FIG. 2 is an illustration of data formats of control and message packets.

FIG. 2 illustrates the data structure of the control and message packets. Each of the control and message packets for data-link layer protocol includes a starting flag 20 indicating the start of the packet, a control field 21, an information field 22, a frame check sequence field 23 and a closing flag 24. The information field of the packets is formatted according to a network layer protocol. The control packet's information field includes a logical channel number (LCN) field 25, a packet identifier (TYP) field 26 which is binary "1", a destination address field 27, a source address field 28 and a control data field 29. The message packet's information field includes the logical channel number field 25 and packet identifier field 26 similar to the control packet. The packet identifier 26 of message packets is a binary "0". The message packet includes a control field 30 and message data field 31 in the information field 22. The LCN field of the message packet contains incoming logical channel number of a virtual circuit at the incoming side of a given switching node and is updated with an outgoing logical channel number of a virtual circuit that extends from the given switching node to an adjacent switching node where the LCN field is used as an incoming logical channel number to detect an outgoing logical channel. The LCN field of the control packet is filled a string of binary "0" as it is not used in switching nodes. Each of the control and message packets is appended with an outgoing physical line number (OPLN) field 32 to be used by an incoming line controller of each switching node to permit message packets to gain access to a desired outgoing line controller as will be described. Source terminals transmit the control and message packets in the form of data-link layer protocol.

Figure 3:
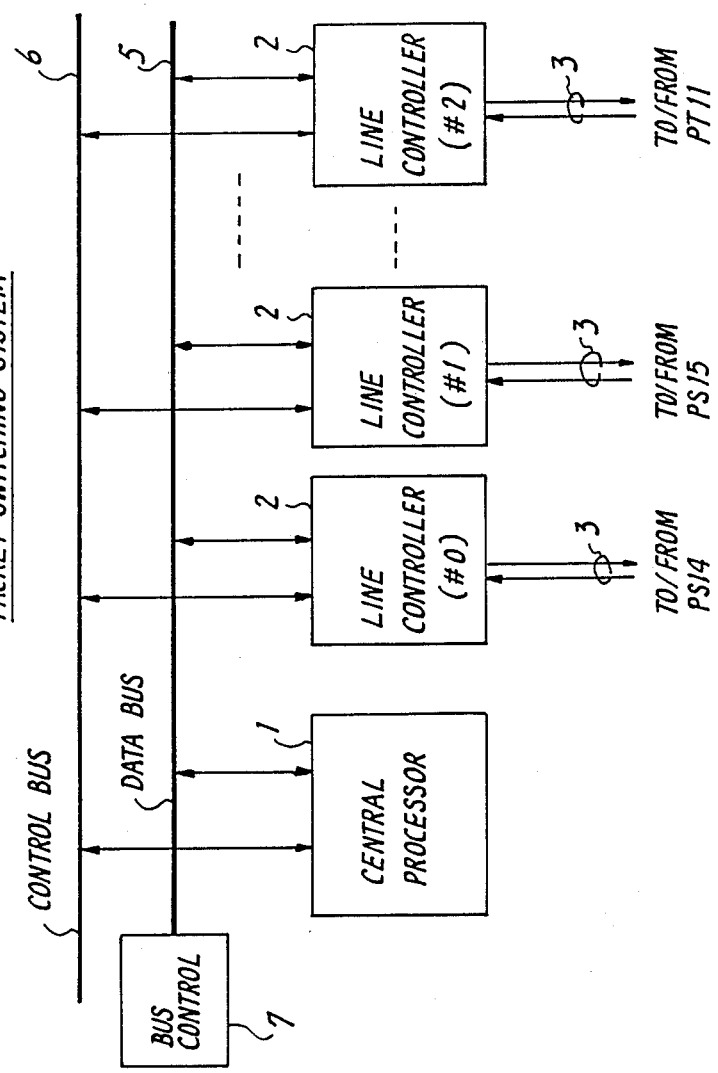
FIG. 3 is a block diagram of a packet switching system of the switching node PS13 of FIG. 1.

As illustrated in FIG. 3, each packet switching node comprises a central processor 1, a plurality of line controllers 2 to which associated terminals or adjacent switching nodes are connected by way of transmission lines 3 which may be four-wire lines or full-duplex facilities. Each line controller 2 operates as an incoming line controller or an outgoing line controller depending on whether it receives a packet through a transmission line or it sends a packet to a transmission line. A control packet is transferred from an incoming line controller through a control bus 6 to the central processor 1 where it is processed and transferred to an outgoing line controller whenever a connection is set up or released. Central processor 1 stores routing information regarding the incoming and outgoing line numbers and incoming and outgoing logical channel numbers whenever a connection is established in accordance with address data contained in the control packet. Message packets are transferred between incoming and outgoing line controllers 2 over a data bus 5 under the control of a bus controller 7. For purposes of illustration, line controllers 2 are assumed to be those of the switching node PS13 and are identified with different line numbers #0, #1 and #2 which are associated with transmission lines extending to switching nodes PS14, PS15 and terminal PT11, respectively.

Figure 4:
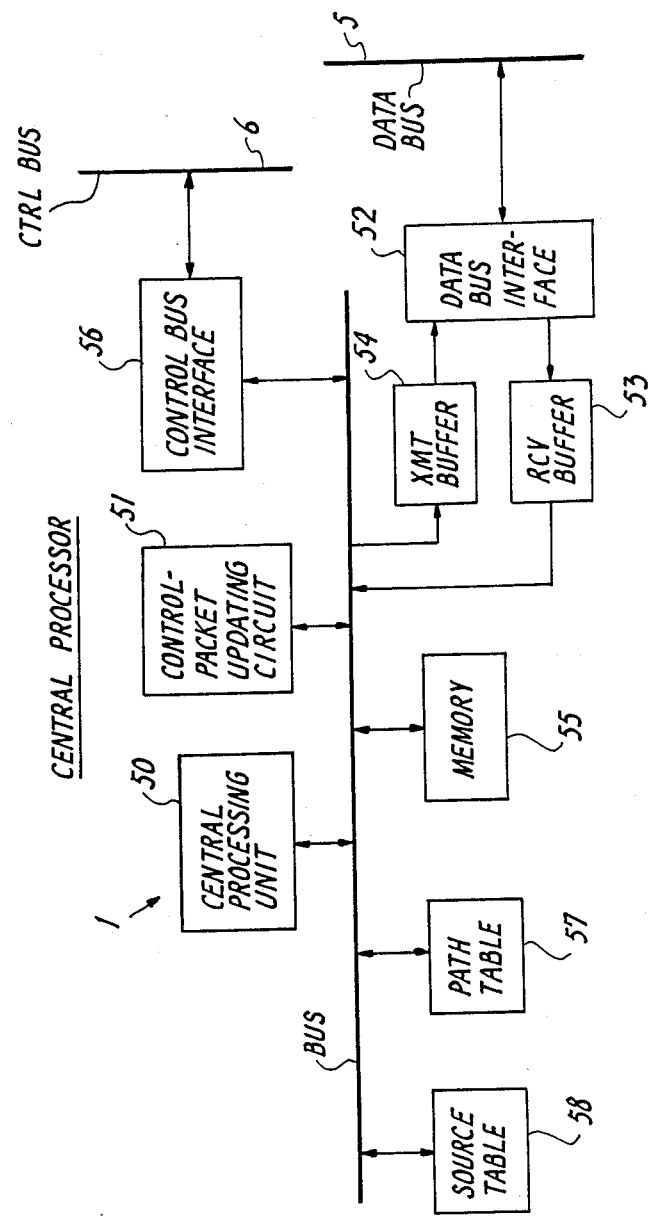
FIG. 4 is a block diagram of the central processor of FIG. 3.

As shown in FIG. 4, the central processor 1 comprises a central processing unit 50 which determines the number of transmission paths available to a source terminal with the aid of a path table 57 in response to a call-request packet it receives from an incoming line controller by way of data bus 5, data bus interface 52 and receive buffer 53 and returns to it a packet indicating the number of available transmission paths. When informed of the number of transmission paths, the source terminal sequentially sends call-setup packets as many as there are available transmission paths. In response to a call-setup packet which is received from the same incoming line controller, the CPU 50 accesses a memory 55 to derive routing information including incoming and outgoing physical line numbers (IPLN, OPLN) and incoming and outgoing logical channel numbers (ILCN, OLCN) from the source and destination address information contained in the control packet and sends such routing information to all the line controllers of the same switching node through the control bus 6 to update their outgoing route tables as will be described. At the same time, a control-packet updating circuit 51 updates the control data field of the received call-setup packet with the outgoing physical line number and outgoing logical channel number. The call-setup packet so processed is sent through a transmit buffer 54 and data bus interface 52 on bus 5 to an outgoing line controller 2 specified by the OPLN data contained in that call-setup packet. The same process is repeated with respect to each of the call-setup packets that follow to thereby establish plural transmission paths, or virtual circuits, from the source terminal to a destination terminal. Central processor 1 further includes a source table 58 which stores source terminal addresses, source switching nodes and incoming logical channels in locations which are addressable as a function of outgoing physical line numbers OPLN. Source table 58 is called upon in the event of a trouble such as fault or traffic overflow in a transmission path to switch subsequent message packets to a trouble-free transmission path.

Figure 5:
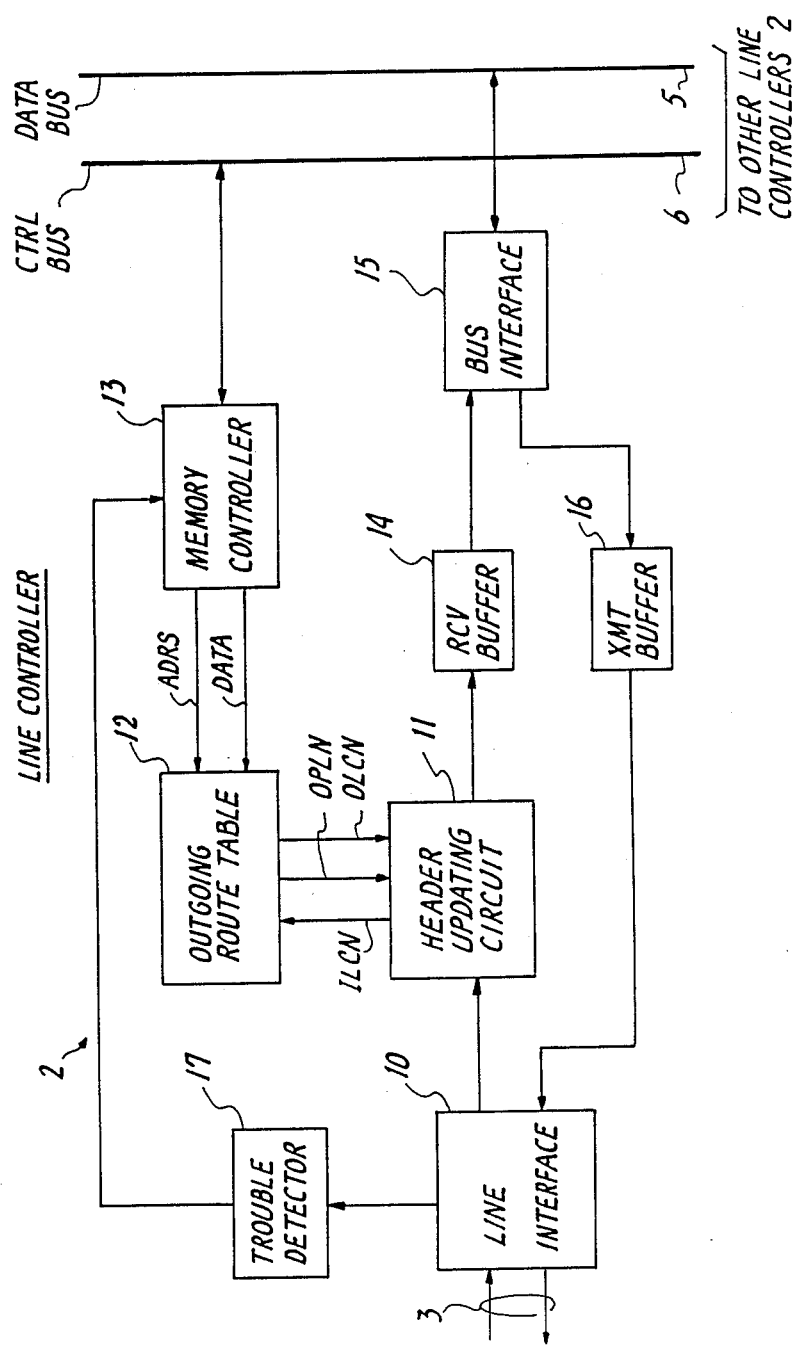
FIG. 5 is a block diagram of a line controller of FIG. 3.

Details of line controller 2 are shown in FIG. 5. Message packets received from a source terminal are passed through a line interface 10 and a header updating circuit 11 to a receive buffer 14 for transfer to an outgoing line controller 2. When message packets are transferred from an incoming line controller, they are sequentially stored into the transmit buffer 16 of the outgoing line controller for transmission through line interface 10 on line 3 to a destination terminal. Line interface 10 includes a receive framing circuit for decoding the starting and closing flags of a packet received, a transmit framing circuit for appending flags to the starting and closing ends of a packet to be sent, an FCS decoder for detecting data errors and an FCS generator for inserting an FCS field to the packet to be transmitted.

Header updating circuit 11 has an input from the line interface 10 to examine the header of a packet received from a source terminal or a source switching node to access the outgoing route table 12 to determine whether the packet is to be sent to the central processor 1 or to a desired outgoing line controller. If the packet includes a binary 1 in the packet identifier field, the updating circuit 11 passes it to the central processor and if the packet includes a binary 0 in the packet identifier field, the circuit 11 recognizes it as a message packet and accesses an outgoing route table 12 to rewrite the logical channel number field of the message packet. During a call request phase, header updating circuit 11 directs a call-request packet to the central processor 1 through a receive buffer 14 and bus interface 15 on data bus 5 to cause it to determine the number of transmission paths available to the source terminal. The information indicating the number of available transmission paths, which is received from the central processor 1, is passed through a bus interface 15 to a transmit buffer 16 and sent through the line interface 10 to the source terminal to allow it to send call-setup packets in sequence. These control packets are directed to the central processor 1 and there is established for each call-setup packet a transmission path extending to the same destination terminal as described above. During the call-setup phase, the routing information derived by the central processor 1 is applied to a memory controller 13 of each line controller to update the outgoing route table 12. After establishment of the connections, the destination terminal returns proceed-to-send packets respectively including the incoming logical channel number indications of the established routes at the source switching node to permit the source terminal to insert a selected one of the received incoming logical channel numbers to message packets that follow. During the period following a call setup phase, message packets are transmitted from the source terminal and header updating circuit 11 addresses the memory 12 as a function of the logical channel number contained in each message packet. A typical example of the contents of table 12 is shown in FIG. 7. Updating circuit 11 reads outgoing physical line number OPLN and outgoing logical channel number OLCN from the table 12 and rewrites the logical channel number LCN field 25 of each message packet with the outgoing logical channel number OLCN read from table 12 and inserts the OPLN data to the OPLN field 32 and sends the updated message packet to data bus 5. Bus interfaces 15 of all line controllers monitor the OPLN field of all message packets to determine whether they are addressed to their own line controllers. If the OPLN data of a message packet propagating through the data bus 5 coincides with the physical line number of a line controller, the bus interface 15 of the line controller reads the packet into the transmit buffer 16 and sends it through line interface to the transmission line. Thus, the updated message packet is received by the addressed line controller and sent to a desired outgoing line. Message packets are thus switched between line controllers without the assistance of the central processor during packet switching phase. The OPLN and OLCN data of the message packet sent to the associated incoming line controller of a succeeding switching node are used as an address pointer (IPLN and ILCN) to access its outgoing route table 12 to update the OLCN and OPLN field of the packet with the OLCN and OPLN data contained in the table 12. This process is repeated until the packet reaches a destination terminal.

A trouble detector 17 is included in the line controller 2. This detector is connected to the line interface 10 to detect any trouble in transmission lines and notifies the memory controller 13 of the occurrence of a trouble when detected. Upon receipt of the trouble indicating signal from detector 17, the memory controller 13 sends a trouble indicating signal to the central processor 1 to permit it to consult the source table 58 to detect a source terminal and source switching node to switch over transmission paths. As will described in detail, the transmission path is re-routed at the source terminal or at a switching node.

CALL-REQUEST AND CALL-SETUP OPERATIONS

For a full understanding of the present invention, reference is now made to FIGS. 6 to 12 with further reference to FIG. 1. Assume that a call is to be established from terminal PT11 to terminal PT12 and there are three transmission paths are available, i.e., transmission paths indicated by PN0 identifying the path that extends through switching nodes PS13, PS14 and PS16, PN1 identifying the path extending through switching nodes PS13, PS15 and PS16, and PN2 identifying the path extending through switching nodes PS13, PS15, PS17 and PS16. As shown in FIG. 1, the transmission routes extending from the switching node PS13 for data communication between terminals PT11 and PT12 include physical lines designated with physical line numbers PLN0, PLN1 and PLN2 which extend respectively to switching nodes PS14, PS15 and source terminal PT11, and those associated with the switching node PS15 are designated PLN0, PLN1 and PLN2, respectively, which extend to switching nodes PS16, PS13 and PS17. When a call-request packet is sent from terminal PT11 to switching node PS13, it is passed through #2 line controller 2, FIG. 1, which is associated with terminal PT11 to the central processor 1. The CPU 50 of the central processor reads the source and destination address data from the call-request packet and seeks routing information from the path table 57. FIG. 6 illustrates the contents of the path table 57. As indicated in the top row of table 57, a set of transmission paths is stored for destination terminal PT12 with respect to source terminal PT11. The CPU 50 communicates the number of available transmission paths, (three in this case) through the #2 line controller to the source terminal PT11 to allow it to send three call-setup packets in succession. The first call-setup packet from terminal PT11 is directed to the central processor 1 where the CPU 50 consults the memory 55 to determine incoming and outgoing logical channel numbers ILCN and OLCN and an outgoing physical line number OPLN and returns these routing information to the memory controller 13 of the #2 line controller to cause it to update the outgoing route table 12. At the same time, control-packet header updating circuit 51 of the central processor updates the OPLN and ILCN fields of the call-setup packet with the information just determined and sends it to an outgoing line controller specified by the outgoing physical line number. The same process is repeated in the succeeding switching nodes on a transmission path as the first call-setup packet propagates through the network, thus establishing a virtual circuit on transmission path PN0 through switching nodes PS13, PS14 and PS16.

It is noted, however, the OPLN and ILCN information obtained at the source switching node PS13 is retained in the call-setup packet until it is received by destination terminal PT12 where it is carried on a proceed-to-send packet sent from the destination terminal to the source terminal PT11 when a connection is established. In a similar manner, a second call-setup packet is processed by switching nodes PS13, PS15 and PS16 to establish a virtual circuit on transmission path PN1 and a third call-packet is processed by switching nodes PS13, PS15, PS17 and PS16 to establish a virtual circuit on transmission path PN2. After the establishment of these virtual circuits, the outgoing route table 12 of switching node PS13 will appear as indicated in FIG. 7. Since the transmission line between switching node PT13 and terminal PT11 is designated number 2 (FIG. 3), a numeral "2" is given to the incoming physical line number (IPLN) column of outgoing route table 12 for terminal PT11. It is assumed that incoming logical channel numbers (ILCN) 0, 1, 2 and outgoing logical channel numbers (OLCN) 0, 1, 2 are assigned respectively to the first, second and third call-setup packets indicated in the top, second and third rows thereof. Outgoing physical line numbers (OPLN) 0, 1, 1 are given respectively to these packets. This means that the outgoing physical line OPLN=0 of the switching node PS13 (FIG. 1) is used exclusively for message packets having incoming logical channel number 0, and the outgoing physical line OPLN=1 is used as a common transmission path for message packets having incoming logical channel numbers 1 and 2. After the destination terminal PT12 has received all the call-setup packets, it detects the incoming logical channel number and outgoing physical line number from the ILCN and OPLN fields of each call-setup packet and returns proceed-to-send packets to the source terminal PT11 in succession corresponding to the first, second and third call-setup packets.

Upon receipt of the proceed-to-send packets from destination terminal PT12, source terminal PT11 detects the incoming logical channel numbers and outgoing physical line numbers from the received proceed-to-send packets and stores them into a path selection table 40 as shown in FIG. 8. Path selection table 40 has busy/idle indicators. A binary "1" in the busy/idle column indicates that the corresponding path is engaged for transmitting message packets and binary "0" in that column indicates idle paths. In this example, the source terminal PT11 selects the transmission path PN0 in preference over other virtual circuits, and so a binary "1" is written into the top row of the table. If the transmission path PN0 has failed, the binary "1" in the busy/idle column of table 40 will be shifted to the second row to allow subsequent message packets to be sent over transmission path PN1 in a manner as will be described later. Likewise, if transmission lines PN0 and PN1 have failed, the binary "1" will be shifted to the third row to allow subsequent packets to be sent through transmission path PN2.

When transmitting a message packet, source terminal PT11 writes the incoming logical channel number (ILCN=0) into the LCN field of the packet and sends it to the switching node PS13. Header updating circuit 11 of #2 line controller seeks outgoing routing information from the outgoing route table 12 by accessing it with the LCN field of the message packet and the IPLN information, which in this case is number 2, and updates the LCN field with the OLCN data read out of the table 12 and appends to it the OPLN data contained in the routing information read out of the table and passes it to #0 line controller which is addressed by the outgoing physical line number (OPLN) field of the message packet. The message packet is therefore sent to the intermediate switching node PS14 where it is similarly processed and sent to the destination switching node PS16. Thus, message packets follow the path established by the first call-setup packet and this manner of transmission continues until a trouble occurs in the transmission path PN0.

RE-ROUTING OPERATION

If a trouble has occurred on the transmission path PN0 between switching nodes PS13 and PS14 and is detected by the trouble detector 17 of the #0 line controller of switching node PS13, the memory controller 13 of this line controller communicates this fact to the central processor 1. Central processor 1 addresses the source table 58, FIG. 9, as a function of the outgoing physical line number to detect a source terminal and an incoming logical channel number. As illustrated in FIG. 9, the source table 58 stores source terminal addresses and incoming logical channel numbers in locations addressable as a function of outgoing physical line numbers OPLN. Knowing that the source terminal is PT11 and the logical channel number is 0, central processor 1 now sends a trouble indication packet to source terminal PT11 to enable it to shift the busy/idle status bit to the second row of table 40, FIG. 8, so that the incoming logical channel number field of subsequent message packets is updated with ILCN=1, whereby transmission route is switched from virtual circuit PN0 to virtual circuit PN1.

In a modified embodiment of the invention, the re-routing operation is effected by rewriting the outgoing route table at a switching node, rather than rewriting the path selection table at the source terminal. Assume that the first priority route which is used first in preference over other virtual circuits is virtual circuit PN1 and the next priority route is on path PN2. For purposes of description, switching node 15 designates its transmission lines to nodes PS16, PS13 and PS17 as #0, #1 and #2, respectively, so that at switching node PS15 the outgoing route table 12 of the incoming line controller 2 which is connected to the #1 line controller of switching node PS13 (FIG. 3) and the source table 58 of the PS15 central processor are written as shown in FIGS. 10 and 11, respectively. When a trouble occurs in the priority path PN1 between switching nodes PS15 and PS16 and is detected by node PS15, its central processor identifies the source terminal PT11 from table 58, FIG. 11, and instructs the memory controller 13 of the PS15 incoming line controller to transpose the incoming logical channel numbers between the first and second rows of the outgoing route table as shown at 12' in FIG. 10.

The renewed outgoing route table 12 is used by subsequent message packets, which find their outgoing logical channel number in the second row of table 12 to propagate through outgoing line to the switching node PS17, thus switching the route from virtual circuit PN1 to virtual circuit PN2 (see FIG. 1). If troubles have occurred simultaneously in virtual circuits PN1 and PN2, one at a location between switching nodes PS15 and PS16 and the other at a location between switching nodes PS15 and PS17, the PS15 central processor addresses the source table 58 to detect the source terminal PT11 and source switching node PS13 as a function of the outgoing physical line number OPLN=0 and sends to it a trouble indication packet. Upon receipt of this packet, the memory controller 13 of #1 line controller at switching node PS13 signals its central processor to cause the outgoing route table 12 of #2 line controller to transpose the incoming logical channel numbers between the first and second rows, whereby subsequent message packets from PS13 follow the transmission path PN0 which extends through #0 line controller to the switching node PS14.

Figures 12, 13:
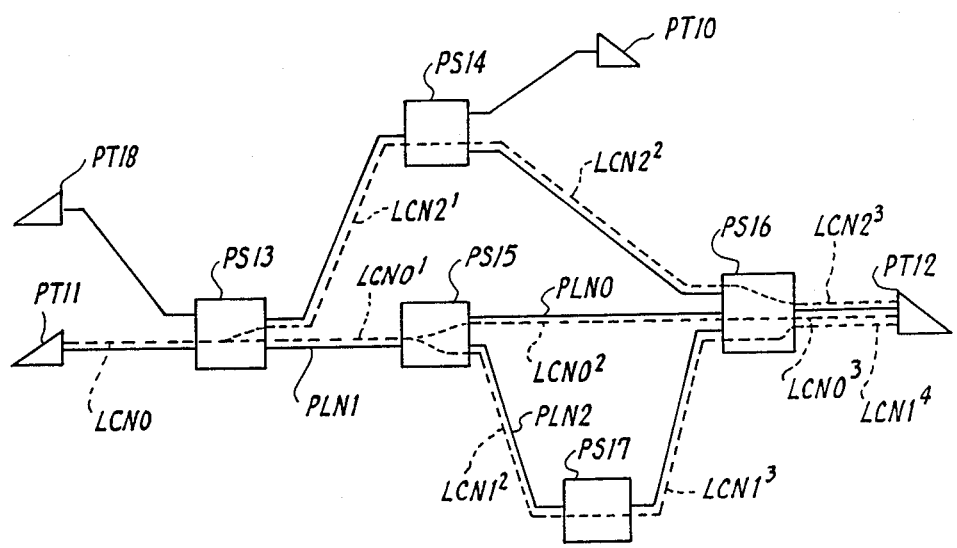
FIG. 12 is a schematic block diagram of the packet-switched communications network according to a modified logical channel numbering scheme.
FIG. 13 is an illustration of a typical example of the outgoing route table of a line controller at switching node PS15 of FIG. 12.

If re-routing operation is effected at an intermediate node such as PS15, only one logical channel number would be sufficient for the switching node PS15 and the same applies to switching node PS13. FIG. 12 illustrates a logical channel numbering scheme in which only one logical channel number is assigned to the incoming lines of switching nodes PS13 and PS15. In this embodiment, the logical channel between source terminal PT11 and interfacing switching node PS13 is designated LCN0 and the logical channel between switching nodes PS13 and PS15 is designated LCN1. FIG. 13 illustrates the contents of the outgoing route table 12 at the switching node PS15 involved in the communication between terminals PT11 and PT12 for the modified embodiment. Table 12 includes a busy/idle status column which stores a binary "1" to specify the logical channel which is being used for transmission of message packets and a binary "0" for indicating idle logical channels. If a trouble occurs between switching nodes PS15 and PS16, the busy/idle binary "1" of the table 12 at PS15 is shifted from the top row to the second row to switch the transmission route to switching node PS17. The outgoing route table 12 which is engaged in communication between terminals PT11 and PT12 at switching node PS13 is similarly modified to include the busy/idle status column to switch its binary "1" if troubles occurs both in the transmission routes from PS15 to PS16 and PS17 to permit switching node PS13 to switch its outgoing logical channel to switching node PS14.

When connections are to be released, a call-clearing packet is sent from the source terminal to erase all the routing information stored in the outgoing route tables 12 and incoming routing tables 58 of the switching nodes participating in the transmission paths PN0, PN1 and PN2.

As can be seen from the foregoing description that whenever a trouble occurs in a transmission path message packets can be quickly re-routed through a trouble-free path. Since the call-established transmission paths are available for other packets on a time-shared basis, the establishment of plural transmission paths for each call does not degrade the blocking probability of the network. Furthermore, since control packets are handled by the central processor for call setup and clearing procedures and message packets go through line controllers without seeking assistance to the central processor, switching between the established transmission paths can be performed at a significantly high speed.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A packet-switched communications network, comprising:
   a plurality of terminals each being capable of sequentially transmitting control packets in response to a request for a call and subsequently transmitting message packets in succession; and
   a plurality of switching nodes connected to one or more of said terminals, each of said switching nodes having means responsive to said control packets for establishing first and second virtual circuits from a source terminal to a destination terminal, means for detecting whether an abnormal condition exists in said first virtual circuit, and means for writing routing information of said first virtual circuit into said message packets to enable same to be propagated through said first virtual circuit and rewriting said routing information of said message packets with routing information of said second virtual circuit when said abnormal condition is detected in said first logical channel.

2. A packet-switched communications network, comprising:
   a plurality of terminals each sequentially generating control packets bearing source and destination address information on a source terminal and a destination terminal before interactive communication begins therebetween and sequentially transmitting message packets each having a routing information field; and
   a plurality of switching nodes, each comprising:
   a memory;
   control means for deriving incoming and outgoing routing information on first and second logical channels from the source and destination address information in said control packets, writing the derived outgoing routing information into said memory, establishing said first and second logical channels from said source terminal to said destination terminal in accordance with the derived outgoing routing information, causing said source terminal to write the derived incoming routing information into the routing information field of each of the message packets, rewriting the routing information field of each of the message packets from said source terminal with the outgoing routing information stored in said memory concerning one of said established logical channels, and enabling said message packets to be propagated through said one of said established logical channels in accordance with the outgoing routing information contained therein; and
   detector means for detecting an abnormal condition in said first and second logical channels and causing said source terminal to rewrite the routing information field of subsequent message packets with the incoming routing information on the other of said established logical channels when said abnormal condition is detected in the packet-propagating logical channel to thereby allow said subsequent message packets to be switched over to said other established logical channel.

3. A packet-switched communications network, comprising:

a plurality of terminals each sequentially generating control packets bearing source and destination address information on a source terminal and a destination terminal before interactive communication begins therebetween and sequentially transmitting message packets each having a routing information field; and a plurality of switching nodes, each comprising:

a memory;

control means for deriving incoming and outgoing routing information on first and second logical channels from the source and destination address information in said control packets, writing the derived outgoing routing information into said memory, establishing said first and second logical channels from said source terminal to said destination terminal in accordance with the derived outgoing routing information, causing said source terminal to write the derived incoming routing information into the routing information field of each of the message packets, rewriting the routing information field of each of the message packets from said source terminal with the derived outgoing routing information stored in said memory concerning one of said established logical channels, and enabling said message packets to be propagated through said one of the established logical channels in accordance with the outgoing routing information contained therein; and detector means for detecting an abnormal condition in said first and second logical channels and rewriting said memory with the outgoing routing information of the other of said established logical channels when said abnormal condition is detected in the packet-propagating logical channel to thereby allow subsequent message packets to be switched over to said other established logical channel.

4. A packet switching system comprising:

a bus;

a plurality of line controllers connected to said bus, each being responsive to control packets and message packets, said message packets having an incoming logical address and an incoming physical address, each of said line controllers including a memory for storing a first set of outgoing logical and physical addresses in a first location and a second set of outgoing logical and physical addresses in a second location, said first and second locations being respectively accessible as a function of said incoming logical and physical addresses of the message packets, said first and second sets defining a plurality of transmission paths, means for updating the incoming logical and physical addresses of said message packets with the logical and physical addresses of an accessed one of said first and second sets, and means for coupling said updated message packets to through said bus to another one of said line controllers determined by the outgoing physical address of said message packets for application to one of said transmission paths;

a central processor for deriving said first and second sets of outgoing logical and physical addresses respectively from said control packets received via said line controllers and writing the derived sets into said memory;

means for detecting an abnormal condition in said transmission paths; and means for causing subsequent message packets to be re-routed to another of said transmission paths if said abnormal condition occurs in said one of the transmission paths.

5. A method for transmitting packets through a communications network, comprising:

sequentially transmitting control packets from a source terminal;

establishing first and second virtual circuits from said source terminal to a destination terminal in accordance with said control packets;

writing routing information of said first virtual circuit into message packets and transmitting same from said source terminal so that the message packets are propagated through said first virtual circuit;

detecting whether an abnormal condition exists in said first virtual circuit; and rewriting said routing information of said message packets with routing information of said second virtual circuit and transmitting same from said source terminal when said abnormal condition is detected in said first virtual circuit so that the message packets are re-routed to said second virtual circuit.

6. A method for transmitting packets through a communications network, comprising:

sequentially transmitting control packets each bearing source and destination address information on said source terminal from said source terminal;

deriving incoming and outgoing routing information on first and second logical channels from the source and destination address information in said control packets;

establishing said first and second logical channels from said source terminal to said destination terminal in accordance with the derived outgoing routing information;

generating a message packet having a routing information field and writing the derived incoming routing information into the routing information field of the message packet and transmitting it from the source terminal;

rewriting the routing information field of each of the message packets received from said terminal with the derived outgoing routing information concerning one of said established logical channels;

causing the message packets to be propagated through said one of the established logical channels in accordance with the outgoing routing information contained therein;

detecting an abnormal condition in said first and second logical channels; and rewriting the routing information field of subsequent message packets with the incoming routing information on the other of said established logical channels when said abnormal condition is detected in the packet-propagating logical channel to thereby allow said subsequent message packets to be switched over to said other established logical channel.

7. A method for transmitting packets through a communications network, comprising:

sequentially transmitting control packets each bearing source and destination address information on said source terminal from said source terminal;

deriving incoming and outgoing routing information on first and second logical channels from the source and destination address information in said control packets;

writing the derived outgoing routing information into a path memory;

establishing said first and second logical channels from said source terminal to said destination terminal in accordance with the derived outgoing routing information;

generating a message packet having a routing information field and writing the derived incoming routing information into the routing information field of the message packet and transmitting it from the source terminal;

rewriting the routing information field of each of the message packets received from said terminal with the outgoing routing information stored in said memory concerning one of the established logical channels;

causing the message packets to be propagated through said one of the established logical channels in accordance with the outgoing routing information contained therein;

detecting an abnormal condition in said first and second logical channels; and rewriting said memory with the outgoing routing information on the other of said established logical channels when said abnormal condition is detected in the packet-propagating logical channel to thereby allow subsequent message packets to be switched over to said other established logical channel.

* * * * *